United States Patent
Bullock et al.

(10) Patent No.: US 6,421,602 B1
(45) Date of Patent: Jul. 16, 2002

(54) METHOD OF NAVIGATION GUIDANCE FOR A DISTRIBUTED COMMUNICATIONS SYSTEM HAVING COMMUNICATIONS NODES

(75) Inventors: James Blake Bullock, Gilbert; Rafael A. Saavedra, Tempe, both of AZ (US)

(73) Assignee: Motorola, Inc., Schaumburg, IL (US)

( * ) Notice: Subject to any disclaimer, the term of this patent is extended or adjusted under 35 U.S.C. 154(b) by 2 days.

(21) Appl. No.: 09/753,833

(22) Filed: Jan. 3, 2001

(51) Int. Cl.[7] .............................................. G08G 1/0968
(52) U.S. Cl. ........................................ 701/201; 701/209
(58) Field of Search .............................. 701/201, 209; 342/357.09, 357.1

(56) References Cited

U.S. PATENT DOCUMENTS

| | | | | |
|---|---|---|---|---|
| 5,220,507 A | * | 6/1993 | Kirson | 340/995 |
| 5,523,950 A | * | 6/1996 | Peterson | 340/905 |
| 5,608,635 A | * | 3/1997 | Tamai | 340/990 |
| 5,675,492 A | * | 10/1997 | Tsuyuki | 340/988 |
| 5,875,412 A | * | 2/1999 | Sulich et al. | 340/988 |
| 6,049,753 A | * | 4/2000 | Nimura | 701/200 |
| 6,107,944 A | * | 8/2000 | Behr et al. | 340/988 |
| 6,249,740 B1 | * | 6/2001 | Ito et al. | 340/910 |
| 6,314,365 B1 | * | 11/2001 | Smith | 340/988 |

FOREIGN PATENT DOCUMENTS

EP      0810571 A1   *  12/1997

* cited by examiner

*Primary Examiner*—Michael J. Zanelli
(74) *Attorney, Agent, or Firm*—Kevin D. Wills

(57) ABSTRACT

A method of navigation guidance includes providing a communications node (104, 106), and a remote communications node (108). The remote communications node (108) requests a navigation route (201, 301) from communications node (102, 104, 106). The navigation route (201, 301) is from a location (202) to a destination location (204). The navigation route (201, 301) is transmitted to remote communications node (108), where the navigation route (201, 301) includes a plurality of route segments (207, 210, 211, 212, 213, 254) based on location (202). The plurality of route segments include a set of multiple route threads from location (202) to destination location (204).

30 Claims, 8 Drawing Sheets

METHOD OF NAVIGATION GUIDANCE FOR A DISTRIBUTED COMMUNICATIONS SYSTEM HAVING COMMUNICATIONS NODES

FIELD OF THE INVENTION

This invention relates generally to navigation guidance and, in particular to a method of navigation guidance for a remote communications node.

BACKGROUND OF THE INVENTION

A distributed navigation system generally has a navigation server component where navigation data is stored and a client component for route guidance. The client component can be an in-vehicle device or some other portable wireless device with a method of determining position.

Prior art methods of providing navigation guidance for client components have numerous deficiencies. For example, existing navigation systems that download route data only download a single route from an origin point to a destination point. When the client component is moving, the client's position changes between the time the route is requested and the time the route data arrives at the client. The client component may move a large distance during route download, and may in fact pass the first maneuver point on the route. If this happens, the entire route becomes useless and the client component must request a new route.

Another problem with this method occurs where there are numerous routes available from the starting location of the client component. Existing guidance systems will only provide one route from the starting location, which may not even be available or accessible to the user of the client component. This can occur in vehicle applications where the vehicle is in a parking lot and the beginning of the route downloaded starts on a street that is not accessible from the parking lot, or a median prevents the vehicle from turning on a street in the direction given by the route. The route then becomes useless and the client component must request a new route once underway on the roadway network, where the timing of route download outlined above can occur further compounding the problem.

Accordingly, there is a significant need for methods of navigation guidance that overcome the deficiencies of the prior art outlined above.

BRIEF DESCRIPTION OF THE DRAWINGS

Referring to the drawing.

Figure 1:
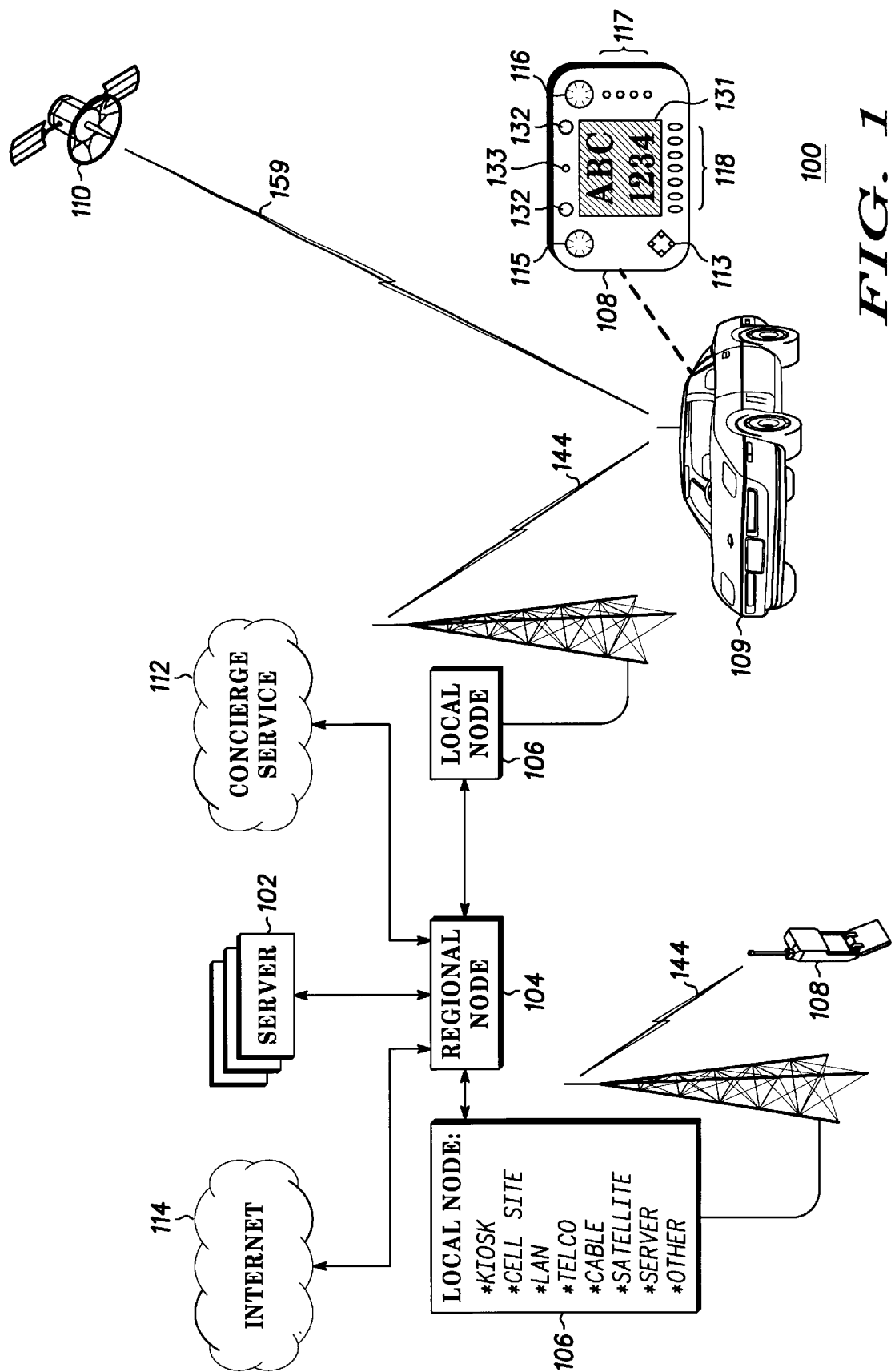
FIG. 1 depicts an exemplary distributed communications system, according to one embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

The present invention is a method of navigation guidance for a distributed communications system with software components running on mobile client platforms and on remote server platforms.

FIG. 1 depicts an exemplary distributed communications system 100 with associated communications nodes 104, 106, 108, according to one embodiment of the invention. Shown in FIG. 1 are examples of components of an distributed communications system 100, which comprises a plurality of servers 102 coupled to a regional node 104, and a plurality of local nodes 106 coupled to regional node 104. There can be any number of servers 102, regional nodes 104, and local nodes 106 within the distributed communications system 100. The regional node 104 can be coupled to a network, such as the Internet 114, and to any number of concierge services 112.

Servers 102, while illustrated as coupled to regional node 104, could be implemented at any hierarchical level(s) within distributed communications system 100. For example, servers 102 could also be implemented within one or more local nodes 106, concierge service 112, and Internet 114.

Without limitation, local node 106 can be a kiosk, cell site, local area network (LAN), telephone company, cable company, satellite, or any other information service, structure, or entity that can transmit, receive, and/or communicate information. An information service can be any desired service including, but not limited to, telecommunications, broadband communications, entertainment, television, radio, recorded music, movies, computer-based games, Internet, and other types of public, private, personal, commercial, government, and military communications.

Local node 106 is coupled to any number of remote communications nodes 108 via wireline or wireless interface means. In the embodiment depicted in FIG. 1, remote communications nodes 108 can transmit and receive information using wireless communications means. Remote communications nodes 108 without limitation can include a wireless unit such as a cellular or Personal Communication Service (PCS) telephone, a pager, a hand-held computing device such as a personal digital assistant (PDA) or Web appliance, or any other type of communications and/or computing device. Without limitation, one or more remote communications nodes 108 can be contained within, and optionally form an integral part of a vehicle, such as a car 109, truck, bus, train, aircraft, or boat, or any type of structure, such as a house, office, school, commercial establishment, and the like. As indicated above, a remote communications node 108 can also be implemented in a device that can be carried by the user of the distributed communications system 100.

In one embodiment, a remote communications node 108 comprises an in-vehicle information appliance comprising various interface elements such as a display 131, a multi-position controller 113, one or more control knobs 115 and 116, one or more indicators 117 such as bulbs or light emitting diodes (LEDs), one or more control buttons 118, one or more speakers 132, a microphone 133, and any other interface elements required by the particular applications to be utilized in conjunction with the information appliance.

Remote communications nodes 108 can also transmit and/or receive data to and from devices and services other than local node 106. For example, remote communications nodes 108 can transmit and receive data to and from a satellite 110.

Figure 2:
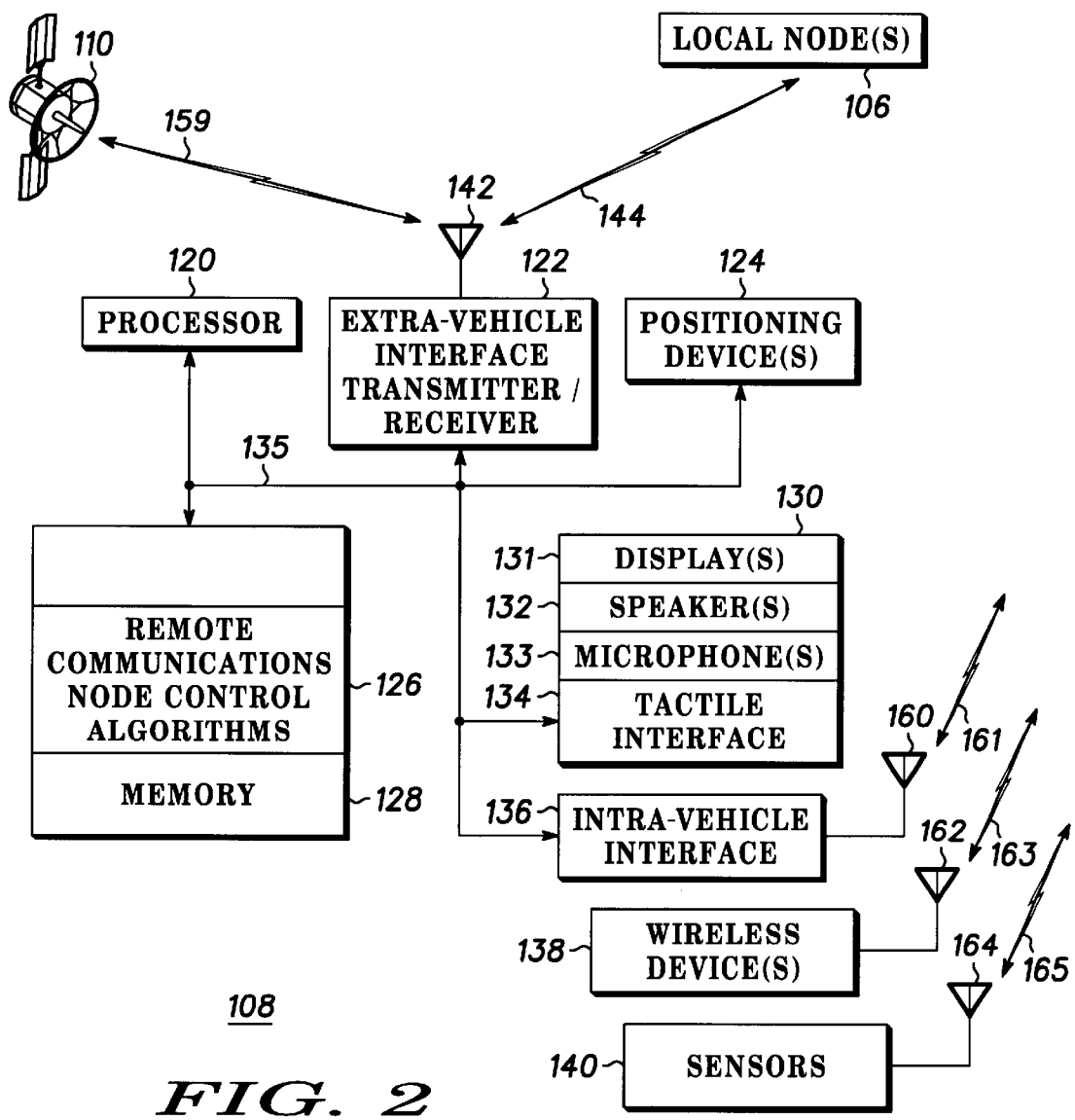
FIG. 2 depicts a remote communications node of an exemplary distributed communications system.

FIG. 2 depicts a remote communications node 108 of an exemplary distributed communications system 100. As indicated above, remote communications node 108 can without limitation be located within or be an integral part of any vehicle, such as an automobile, truck, bus, train, aircraft, or boat, or be carried with a user, or be located in a stationary location or structure, and the like. As shown in FIG. 2, the remote communications node 108 comprises a processor 120 with associated remote communications node memory 128. Remote communications node memory 128 comprises remote communications node control algorithms 126. Remote communications node memory 128 can include, but is not limited to, random access memory (RAM), read only memory (ROM), flash memory, and other memory such as a hard disk, floppy disk, and/or other appropriate type of memory. Remote communications node 108 can initiate and perform communications with other nodes shown in FIG. 1 in accordance with suitable computer programs, such as remote communications node control algorithms 126, stored in remote communications node memory 128.

Remote communications node 108 also comprises a user interface device 130 that can include without limitation a tactile interface 134, microphone 133, speakers 132, any number of displays 131, and the like.

Remote communications node 108 also comprises an extra-vehicle interface 122, typically implemented as a transmitter/receiver for transmitting and receiving communications via a wireless link 144 among the various nodes depicted in FIG. 1. Extra-vehicle interface 122 also facilitates communications among other devices via wireless link 159, for example, satellite 110, and the like. Communications are transmitted and received through one or more antennas 142 of any type. Remote communications node 108 can also include positioning devices 124 of any type, for example, global positioning system (GPS), gyroscope, compass, accelerometer, altimeter, rate sensors, and other positioning devices 124 that can define the position, attitude, and/or motion vector of the remote communications node 108.

Remote communications node 108 can also comprise an intra-vehicle interface 136, which can include antenna 160. Intra-vehicle interface 136 can include multiple types of transceivers (not shown) and antennas 160 to implement different short-range wireless protocols, such as Bluetooth™, IEEE wireless local area network (LAN) standard 802.11, and infrared. Intra-vehicle interface 136 is capable of short-range wireless communications, via wireless link 161, with other wireless devices 138 and sensors 140 of any type, for example, wireless telephones, computers, pagers, PDA's, entertainment devices, printers, fax machines, wireless local networks such as Bluetooth™, vehicle sensors, vehicle actuators, vehicle displays, and the like. In addition, intra-vehicle interface 136 can be used to communicate with wireless devices that are physically outside the vehicle but close to the vehicle, such as a service station kiosk. One or more wireless devices 138 can comprise one or more antennas such as antenna 162 and communicate via wireless link 163. One or more sensors 140 can comprise one or more antennas such as antenna 164 and communicate via wireless link 165.

In one embodiment, the various components and systems in FIG. 2 can communicate with each other via a wireline link 135, for example, a power/data/control bus, and the like. In another embodiment, some of the various components and systems in FIG. 2 could communicate via a wireless link.

Figure 3:
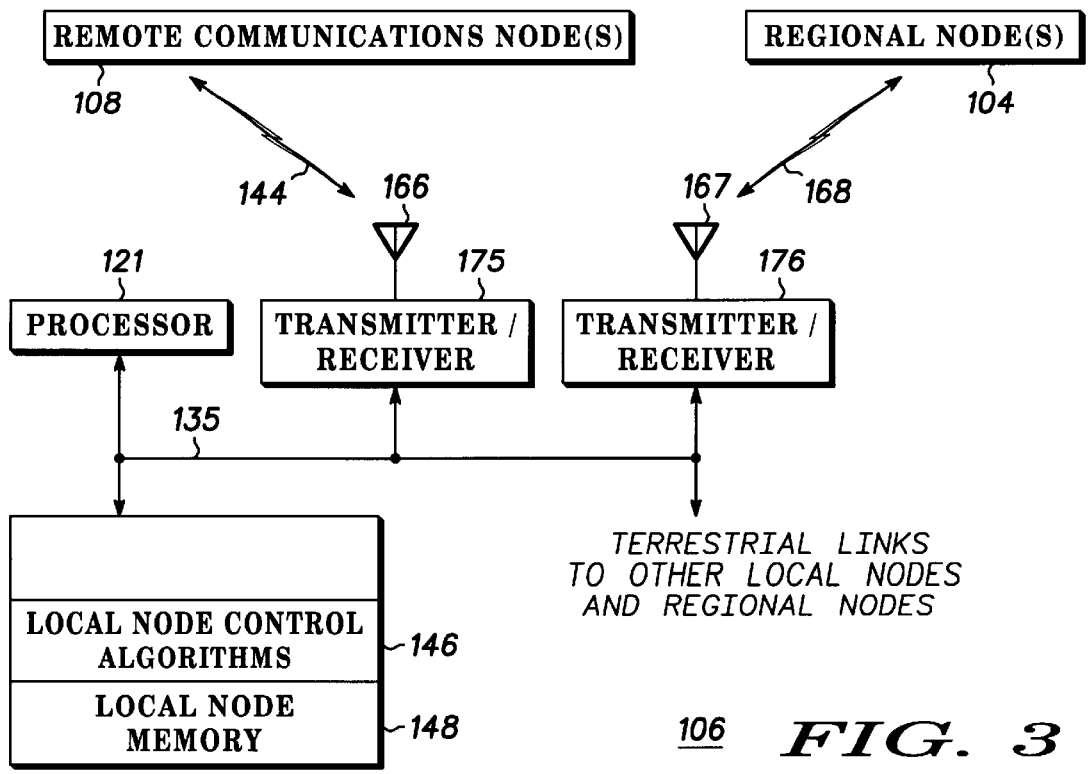
FIG. 3 depicts a local node of an exemplary distributed communications system.

FIG. 3 depicts a local node 106 of an exemplary distributed communications system 100. As shown in FIG. 3, the local node 106 comprises a processor 121 with associated local node memory 148. Local node memory 148 comprises local node control algorithms 146. Local node memory 148 can include, but is not limited to, random access memory (RAM), read only memory (ROM), and other memory such as a hard disk, floppy disk, and/or other appropriate type of memory. Local node 106 can initiate and perform communications with other nodes shown in FIG. 1 in accordance with suitable computer programs, such as local node control algorithms 146, stored in local node memory 148.

Local node 106 also comprises any number of transmitters/receivers 175 for transmitting and receiving communications via wireless link 144 to and from any number of remote communications nodes 108. Communications are transmitted and received through antenna 166.

Local node 106 also comprises any number of transmitter/receivers 176 for transmitting and receiving communications via wireless link 168 to and from any number of regional nodes 104. Communications are transmitted and received through antenna 167. As shown in FIG. 3, the various components and systems can also communicate via terrestrial links such as wireline, radio frequency (RF), or optical links, and the like, with other local nodes 106 and regional nodes 104.

In one embodiment, the various components and systems in FIG. 3 can communicate with each other via a wireline link 135, for example, a power/data/control bus, and the like. In another embodiment, some of the various components and systems in FIG. 3 could communicate via a wireless link.

Figure 4:
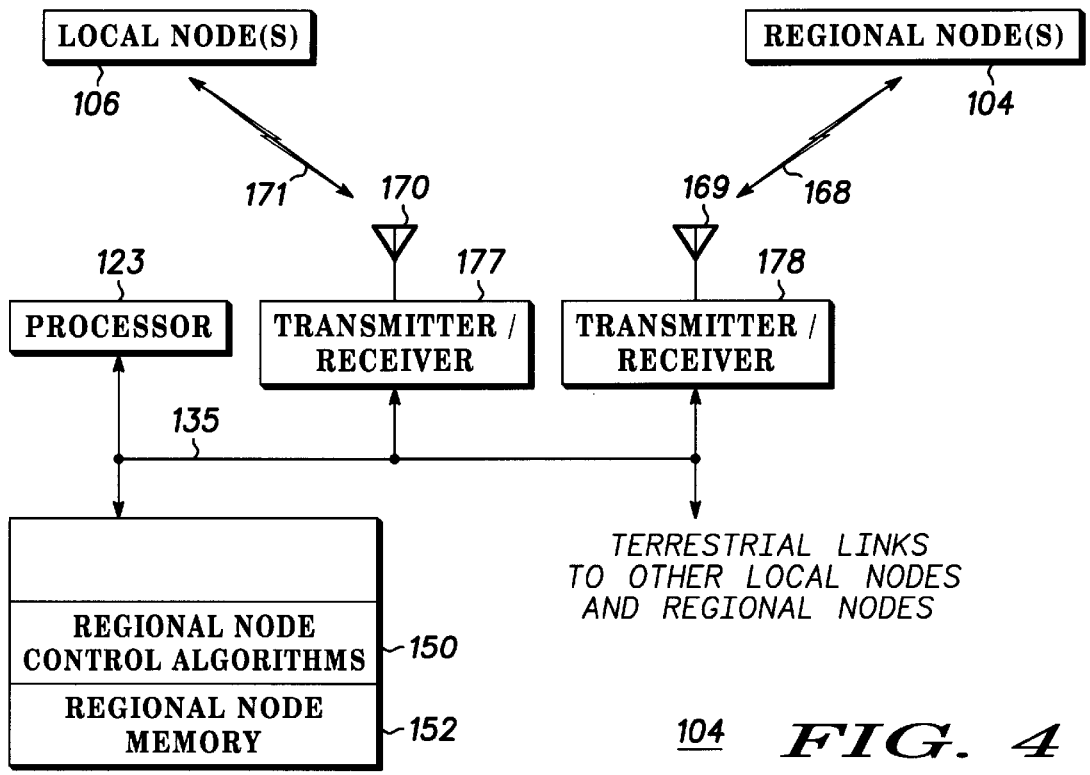
FIG. 4 depicts a regional node of an exemplary distributed communications system.

FIG. 4 depicts a regional node 104 of an exemplary distributed communications system 100. As shown in FIG. 4, the regional node 104 comprises a processor 123 with associated regional node memory 152. Regional node memory 152 comprises regional node control algorithms 150. Regional node memory 152 can include, but is not limited to, random access memory (RAM), read only memory (ROM), and other memory such as a hard disk, floppy disk, and/or other appropriate type of memory. Regional node 104 can initiate and perform communications with other nodes shown in FIG. 1 in accordance with suitable computer programs, such as regional node control algorithms 150, stored in regional node memory 152.

Regional node 104 also comprises any number of transmitters/receivers 177 for transmitting and receiving communications via wireless link 171 to and from any number of local nodes 106. Communications are transmitted and received through an antenna 170.

Regional node 104 also comprises any number of transmitters/receivers 178 for transmitting and receiving communications via wireless link 168 to and from any number of regional nodes 104, servers 102, and the like.

Communications are transmitted and received through antenna 169. As shown in FIG. 4, the various components and systems can also communicate, via terrestrial links such as wireline, radio frequency (RF), or optical links, and the like, with other local nodes 106 and regional nodes 104.

In one embodiment, the various components and systems in FIG. 4 can communicate with each other via a wireline link 135, for example, a power/data/control bus, and the like. In another embodiment, some of the various components and systems in FIG. 4 could communicate via a wireless link.

In FIGS. 2–4, processors 120, 121, and 123, respectively, perform distributed, yet coordinated, control functions within distributed communications system 100 (FIG. 1). Processors 120, 121, and 123 are merely representative, and distributed communications system 100 can comprise many more processors within the distributed servers 102, regional nodes 104, local nodes 106, and remote communications nodes 108.

Processors 120, 121, and 123 can be of any suitable type or types, depending upon the functional requirements of the overall distributed communications system 100 and its constituent elements, including servers 102, regional nodes 104, local nodes 106, and remote communications nodes 108.

Processors 120, 121, and 123 comprise portions of data processing systems that perform processing operations on computer programs that are stored in computer memory such as, but not limited to, remote communications node memory 128, local node memory 148, and regional node memory 152. Processors 120, 121, and 123 also read data from and store data to memory, and they generate and receive control signals to and from other elements within distributed communications system 100.

The particular elements of the distributed communications system 100, including the elements of the data processing systems, are not limited to those shown and described, and they can take any form that will implement the functions of the invention herein described.

To provide an example of one context in which the present invention may be used, an example of a method of navigation guidance applied to a remote communications node will now be described. The present invention is not limited to implementation by any particular set of elements, and the description herein is merely representational of one embodiment. The specifics of one or more embodiments of the invention are provided below in sufficient detail to enable one of ordinary skill in the art to understand and practice the present invention.

Figure 5:
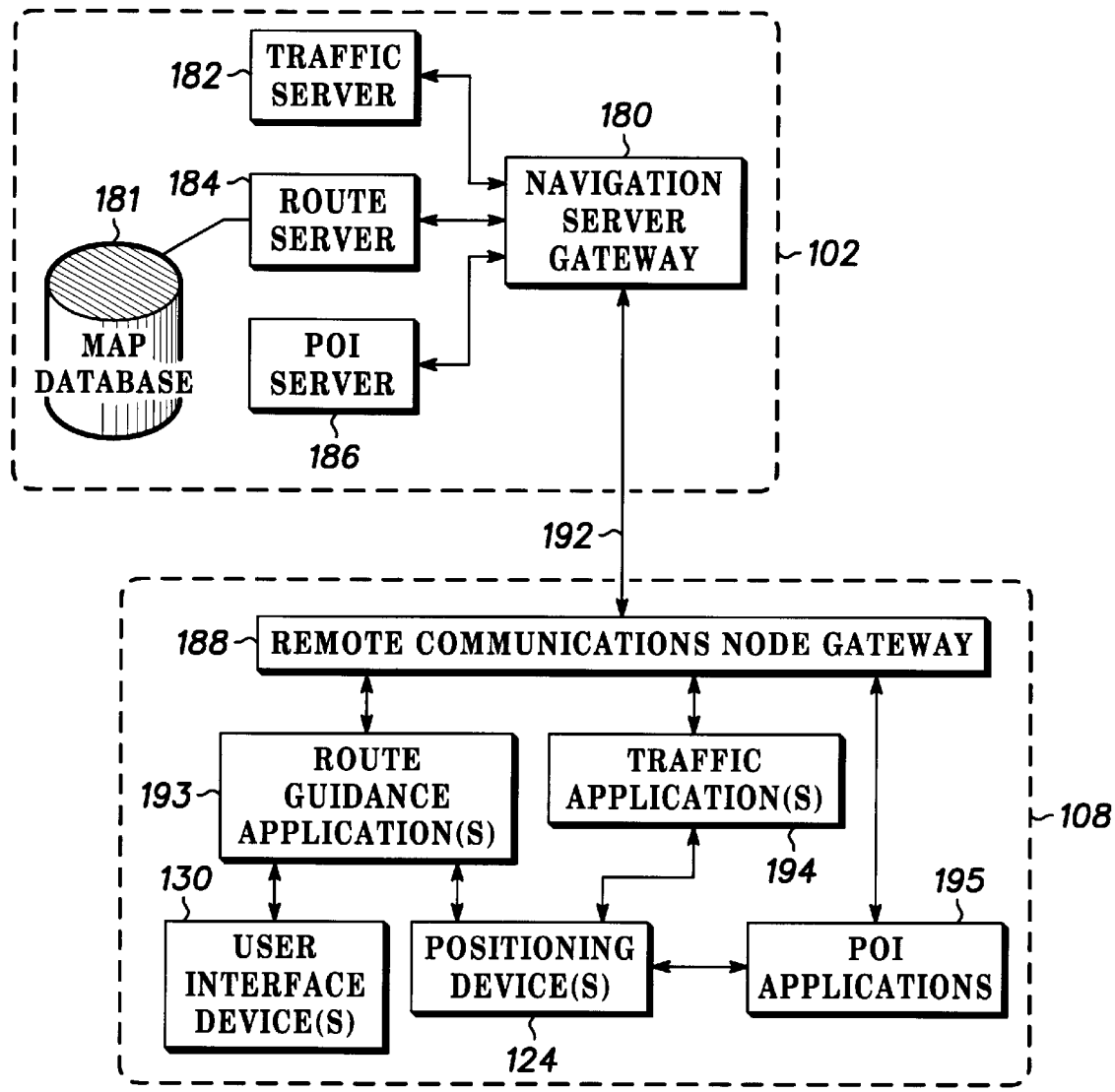
FIG. 5 illustrates a simplified block diagram showing a navigation portion of distributed communications system according to one embodiment of the invention.

FIG. 5 illustrates a simplified block diagram showing a navigation portion of distributed communications system 100 according to one embodiment of the invention. As shown in FIG. 5, servers 102 can comprise a navigation server gateway 180 coupled to various servers and software blocks, such as, a traffic server 182, a route server 184, and a point-of-interest (POI) server 186.

Traffic server 182 can contain traffic information including, but not limited to, traffic reports, traffic conditions, speed data, and the like. Route server 184 can contain information including, but not limited to, digital road map data, route alternatives, route guidance, and the like. Route server 184 is coupled to a map database 181, which can be a distributed map database. Map database 181 contains additional digital roadmap data. POI server 186 can contain information for points of interests such as gasoline stations, restaurants, motels, movie theatres, and the like.

Each of traffic server 182, route server 184, and POI server 186 can send and receive content data from external sources such as local traffic reports, news agencies, and the like, in addition to content data already stored on servers 102.

Each of servers 102 depicted in FIG. 5 communicate with remote communications node 108 through navigation server gateway 180 via wireless link 192. Servers 102 communicate via any of communications nodes depicted in FIG. 1. Wireless link 192, couples navigation server gateway 180 with its counterpart, remote communications node gateway 188. Remote communications node gateway 188 is coupled to various navigation applications, which can include, without limitation, route guidance application(s) 193, traffic application(s) 194, POI application(s) 195, and the like. Navigation applications 193, 194, 195 are coupled to, and can process data received from servers 102, positioning devices 124, satellites 110, and the like, to provide useful content to users of remote communications node 108. User interface device(s) 130 are coupled to navigation applications 193, 194, 195 and can request and display route guidance data including, navigation route data, digital roadmap data, and the like.

Software blocks that perform embodiments of the invention are part of computer program modules comprising computer instructions, such as local node control algorithms 146 (FIG. 3), that are stored in a computer-readable medium such as local node memory 148. Computer instructions can instruct processors 120, 121, 123 to perform methods of operating communications node(s) 104, 106, 108. Additionally, or alternatively, they can be implemented as regional node control algorithms 150 (FIG. 4), which are stored in regional node memory 152. Software blocks and computer program modules can also be located in remote communications node 108. In other embodiments, additional modules could be provided as needed, and/or unneeded modules could be deleted.

Figure 6:
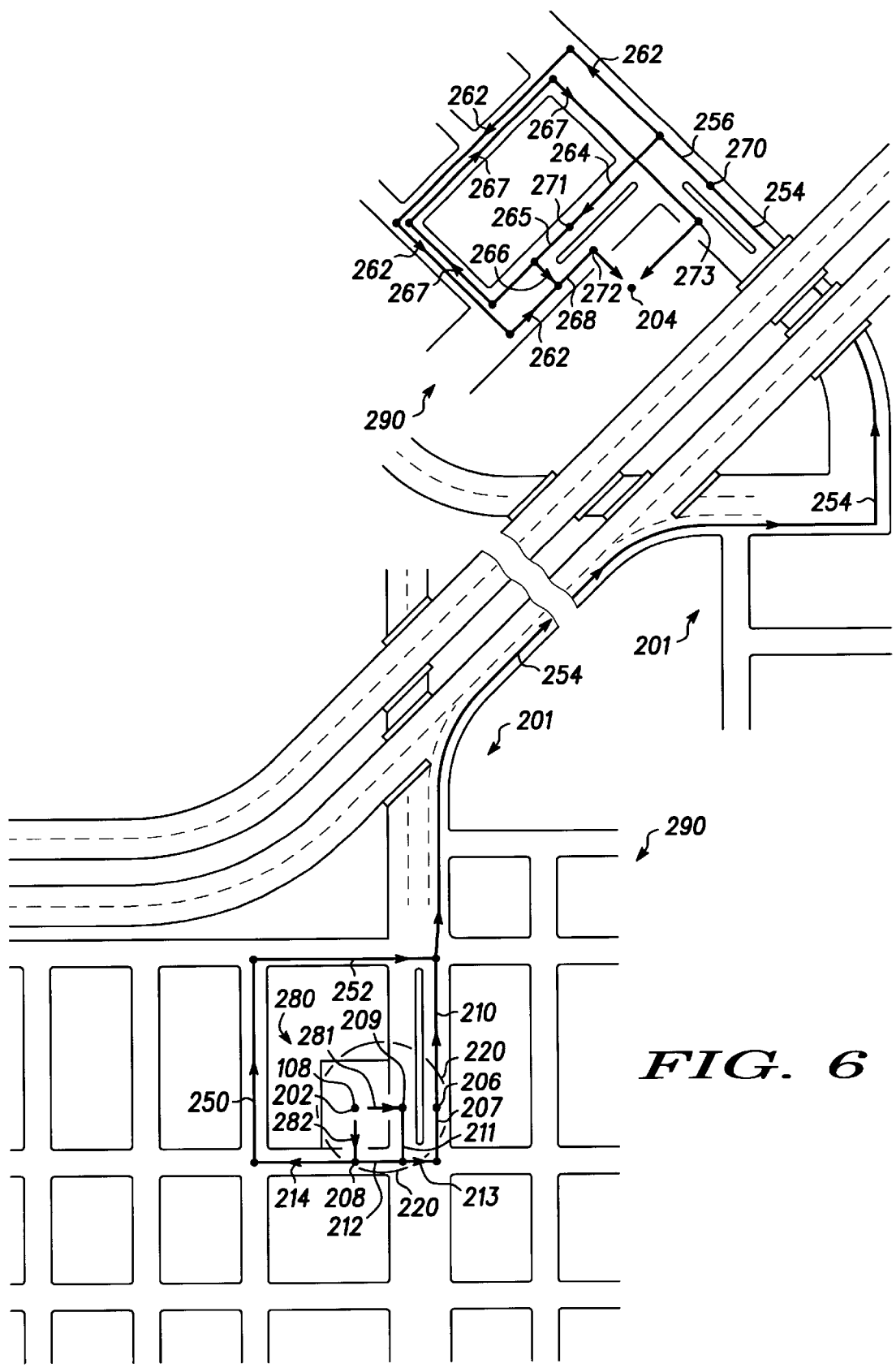
FIG. 6 depicts a simplified roadway network illustrating an exemplary embodiment of the invention.

FIG. 6 depicts a simplified roadway network 290 illustrating an exemplary embodiment of the invention. As shown in FIG. 6, remote communications node 108 is in a location 202, which can be a starting location. Remote communications node 108 can either be moving or stationary. In the embodiment shown, remote communications node 108 can be mounted in a vehicle, carried with a user, and the like.

In the embodiment depicted in FIG. 6, remote communications node 108 at location 202 requests a navigation route 201 from location 202 to destination location 204. Navigation route 201 is transmitted from communications node(s), which can be, without limitation, regional node 104, local node 106, satellite 110, or other remote communications node 108. Navigation route 201 is comprised of a plurality of route segments, which are depicted in FIG. 6 as lines with arrows in the roadway network 290. Plurality of route segments are based on the location 202 of remote communications node 108. Plurality of route segments of navigation route 201 comprise a set of multiple route threads from the location 202 of remote communications node 108 to destination location 204. Set of multiple route threads comprise different routes from location 202 to destination location 204.

In an embodiment of the invention, plurality of starting locations 206, 208, 209 based on location 202 are determined by route server 184 and transmitted to remote communications node 108. In another embodiment, plurality of starting locations 206, 208, 209 are determined by remote communications node 108. In still another embodiment, plurality of starting locations 206, 208, 209 are determined by a combination of route server 184 and remote communications node 108. The invention is not limited by the foregoing examples and can include any method or combination of elements to determine plurality of staring locations 206, 208, 209.

In FIG. 6, the plurality of staring locations 206, 208, 209 correspond to exits 281, 282 (as shown by arrows) from a parking lot 280. Although three starting locations 206, 208, 209 are depicted, the invention includes any number of starting locations 206, 208, 209. Plurality of starting locations 206, 208, 209 can be based on a locus of possible starting locations within a radius 220 of location 202 of remote communications node 108. The radius 220 and hence the locus of possible starting locations can be user-defined and based on the number of exits 281, 282 to the roadway network 290. In the embodiment shown in FIG. 6, the locus of possible locations includes the plurality of starting locations 206, 208, 209. Plurality of starting locations 206, 208, 209 can include starting locations based on all nearby road segments to location 202.

In an embodiment of the invention, plurality of starting locations 206, 208, 209 can be based on the accuracy of location 202 of remote communications node 108. The accuracy can be estimated using location 202 and a velocity vector, derived by utilizing data from positioning devices 124 and their accompanying accuracy, or calculated utilizing recent historical data on location 202. These are only examples, other methods of determining accuracy of location 202 and combinations thereof are within the scope of the invention.

Each of the plurality of starting locations 206, 208, 209 corresponds to at least one starting route segment 210, 211, 212, 214. For example, starting location 206 corresponds to starting route segment 210 because if remote communications node 108 were to begin navigation route 201 at staring location 206, it would proceed on starting route segment 210 first, in order to reach destination location 204. In another example, starting location 208 corresponds to starting route segments 212 and 214. If remote communications node 108 were to begin navigation route 201 at staring location 208, either starting route 212 or 214 can be utilized depending on which direction remote communications node 108 takes. In yet another example, starting location 209 corresponds to starting route segment 211.

Each of the plurality of starting locations 206, 208, 209 comprises the beginning of at least one route thread in the set of multiple route threads transmitted to remote communications node 108. A route thread comprises a unique set of route segments from location 202 of remote communications node 108 to destination location 204. Together, the unique set of route segments make up one potential navigation route 201. For example, in the embodiment shown in FIG. 6, one route thread in the set of multiple route threads is based on starting location 206 and includes route segments 210, 254, and the like. Another route thread is based on starting location 208 and includes route segments 214, 250, 252, 254, and the like. Yet another route thread is based on starting location 208 and includes route segments 212, 213, 207, 210, 254, and the like. Still another route thread is based on starting location 209 and includes route segments 211, 213, 207, 210, 254, and the like, if a u-turn is legal at route segment 211. If a u-turn is not legal at route segment 211, then the route thread based on starting location 209 includes route segments 211, 212, 214, 250, 252, 254, and the like. Any route segment depicted in FIG. 6 can be further broken down into any number of smaller route segments. For example, route segment 254 can be broken down into any number of smaller route segments based on the number of maneuvers required. Route segment 254 is shown in FIG. 6 as a single segment for convenience, but can be parsed down to any number of smaller route segments.

Plurality of starting locations 206, 208, 209 generally occur on the roadway network 290 because digital roadmap and navigation data is generally not available that specifically includes parking lots and private entrances to roadway network 290. Because of this, plurality of starting locations 206, 208, 209 and corresponding starting route segments 210, 211, 212, 214 are within the roadway network 290. The invention is not limited to this configuration however. Other databases that incorporate private entrances to the roadway network 290, roadway medians, parking lots, and other details can be incorporated into general navigation content and be included within the scope of the invention. If the aforementioned navigation content is incorporated, plurality of starting locations 206, 208, 209 and corresponding starting route segments 210, 211, 212, 214 can extend into such detail.

The embodiment of the invention offers numerous advantages. For example, transmitting multiple route threads based on location 202 of remote communications node 108 allows each possible starting location for navigation route 201 to be downloaded to remote communications node 108 based on location 202. In a classical route calculation scheme, the optimum route from location 202 to location 204 will be computed. The optimum route would tend to have the user turn left from the parking lot onto route segment 210. As can be seen in FIG. 6, a left turn onto route segment 210 is impossible because of the median. However, the map database 181 used to generate optimum routes may not have this information, so an optimum route may be erroneously generated showing an illegal left turn. As soon as the user turns right onto route segment 211 instead, the user will be off the optimum navigation route and the remote communications node 108 will be unable to provide navigation instructions to the user. In other cases, a turn or maneuver may be possible on the road network, but traffic or construction conditions make the turn or maneuver difficult, dangerous, or impossible. Therefore, if one or more starting locations and corresponding staring route segments are not accessible from location 202 (i.e. starting location 206 and starting route segment 210 are blocked by the road median), other starting locations and route segments are immediately available to remote communications node 108 and the corresponding user. This alleviates having to download a new navigation route 201 to remote communications node 108. Another advantage is that after remote communications node 108 enters the roadway network 290 at any starting location, the route thread will already be downloaded along with the required maneuvers for remote communications node 108 to reach destination location 204. In an embodiment, the number of starting locations, starting route segments, route threads and the proximity of starting route segments to location 202 can be set or adjusted by the user of remote communications node 108 or a system administrator of the navigation system.

Once the remote communications node commences traveling to destination location 204, the route guidance software detects the nearest route thread to the current location of remote communications node 108 and gives the user the appropriate maneuver instruction for that route thread. If the user is unable to utilize that route thread, they may turn in a different direction or onto a different road altogether. As this happens, the route guidance software detects the route segment that now most closely matches the location and heading of remote communications node 108. The maneuver instruction corresponding to the matched route segment in the alternate route thread is given to the user and the route guidance commences. Many other route guidance strategies are possible and are included within the scope of the invention.

Another embodiment of the invention is depicted in FIG. 6. Multiple route threads can also be included for the proximity of destination location 204. This has the advantage of avoiding similar difficulties that can develop at location 202 (for example, one or more entrances to destination location from the road network may be inaccessible due to medians, barriers, and the like). The number of route threads and the proximity of ending route segments to destination location 204 can be set or adjusted by the user of remote communications node 108 or a system administrator of the navigation system. Multiple route threads pertaining to destination location 204 can be transmitted to remote communications node 108 with the initial transmission of navigation route 201, transmitted in route, transmitted on request, and the like.

In the embodiment depicted in FIG. 6, plurality of ending locations 270, 271, 272, 273 are available at destination location 204. Destination location 204 is inaccessible from ending locations 270, 271 due to the road medians. However, destination location 204 is accessible from ending locations 272 and 273. Since multiple route threads are already downloaded to remote communications node 108, a route thread is already available to guide the user of remote communications node 108 to destination location 204 at ending location 272 via route segments 256, 262 and 268. An alternate route thread is available for ending location 272 via route segments 256, 264, 265, 266 and 268. Route segment 262 is shown as one segment for convenience, but could be shown as any number of smaller route segments, for example one route segment for each maneuver required. If a u-turn is not permitted at route segment 265, ending location 273 is available via route segments 256, 264, 265, and 267. The route threads shown in FIG. 6 are representative and many other combinations of route threads are possible and within the scope of the invention.

In the present embodiment, plurality of ending locations 270, 271, 272, 273 occur on the roadway network 290 because data is generally not available that specifically includes parking lots and private entrances to the roadway network 290. Because of this, plurality of ending locations 270, 271, 272, 273 and corresponding ending route segments 254, 262, 264, 268 are within the roadway network 290. The invention is not limited to this configuration however. Other databases that incorporate private entrances to the roadway network 290, roadway medians, parking lots, and other details can be incorporated into general navigation content and be included within the scope of the invention. If the aforementioned navigation content is incorporated, plurality of ending locations 270, 271, 272, 273 and corresponding ending route segments 254, 262, 264, 268 can extend into such detail as additional content is provided or available.

In another embodiment, at any point along navigation route 201, remote communications node 108 can either request or have automatically updated the set of multiple route threads based on the present location of remote communications node 108 and destination location 204. Updating can also occur as each of the plurality of route segments is completed. While remote communications node 108 is non-stationary, any updates to set of multiple route threads can be based on the location 202 and velocity vector of remote communications node 108. The velocity vector can comprise velocity, heading, elevation, and the like, of remote communications node 108. The velocity vector can be computed from positioning devices 124 utilizing route guidance applications 193, with velocity vector and location data transmitted to communications nodes 104, 106 and severs 102.

Figure 7:
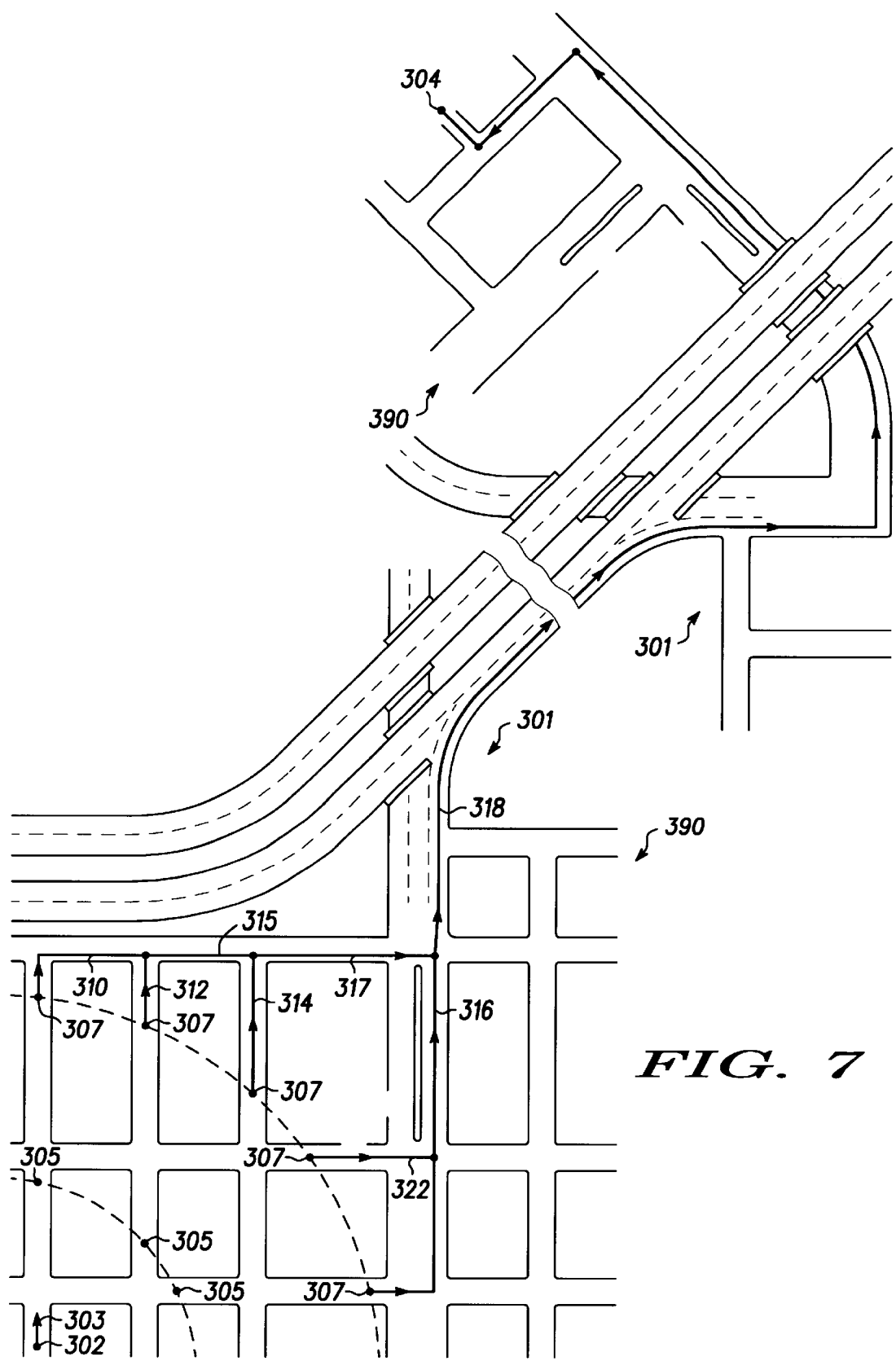
FIG. 7 depicts a simplified roadway network illustrating another exemplary embodiment of the invention.

FIG. 7 depicts a simplified roadway network 390 illustrating another exemplary embodiment of the invention. As shown in FIG. 7, remote communications node 108 is non-stationary on the roadway network 390, located in first location 302 at a first time ($T_1$) with a velocity vector 303. At $T_1$, remote communications node 108 requests navigation route 301 to destination location 304. At $T_1$ remote communications node 108 also transmits first location 302 and velocity vector 303 to servers 102 via communications node 104, 106 108.

Severs 102 at communications node 104, 106, 108 utilizes first location 302 and velocity vector 303 to calculate a locus of possible second locations 305, 307 of remote communications node 108 at a second time ($T_2$). While the request of navigation route 301 occurs at $T_1$, receipt of navigation route 301 occurs at $T_2$. Navigation route 301 transmitted to remote communications node 108 is based on the locus of possible second locations 305, 307.

Locus of possible second locations 305, 307 includes all possible locations of remote communications node 108 on the roadway network 390. For example, in FIG. 7, the first location 302 and velocity vector 303 of remote communications node 108 indicate that remote communications node 108 can be in locus of possible second locations 305 if traveling at one velocity, and locus of possible second locations 307 if traveling at a larger velocity.

Taking the locus of possible second locations 307 as an example, a set of multiple route threads for the locus of possible second locations 307 is transmitted to remote communications node 108. As shown in FIG. 7, navigation route 301 has route segment 318 in common with each of the multiple route threads. In the example shown, the following set of multiple route threads are transmitted: 1) route segments 310, 315, 317; 2) route segments 312, 315, 317; 3) route segments 314, 317; and 4) route segments 322, 316, with each of these four route threads having route segment 318 in common. In the embodiment shown, several route threads have some route segments in common. In another embodiment, route threads do not have any route segments in common. Route segment 318 is shown as one route segment for convenience and can be parsed to any number of smaller route segments based on the maneuvers required, and the like.

In an embodiment of the invention, navigation route 301 is transmitted sequentially with the route segments nearest the locus of possible second locations 307 transmitted first. This enables remote communications node 108 to begin maneuvers prior to receiving the entire navigation route 301. The route guidance software uses the current location of remote communications node 108 to determine which of the downloaded route segments is closest to the vehicle position. The preferred route thread corresponding to that route segment is selected as the active route and the maneuver instructions are communicated to the user as appropriate.

Figure 8:
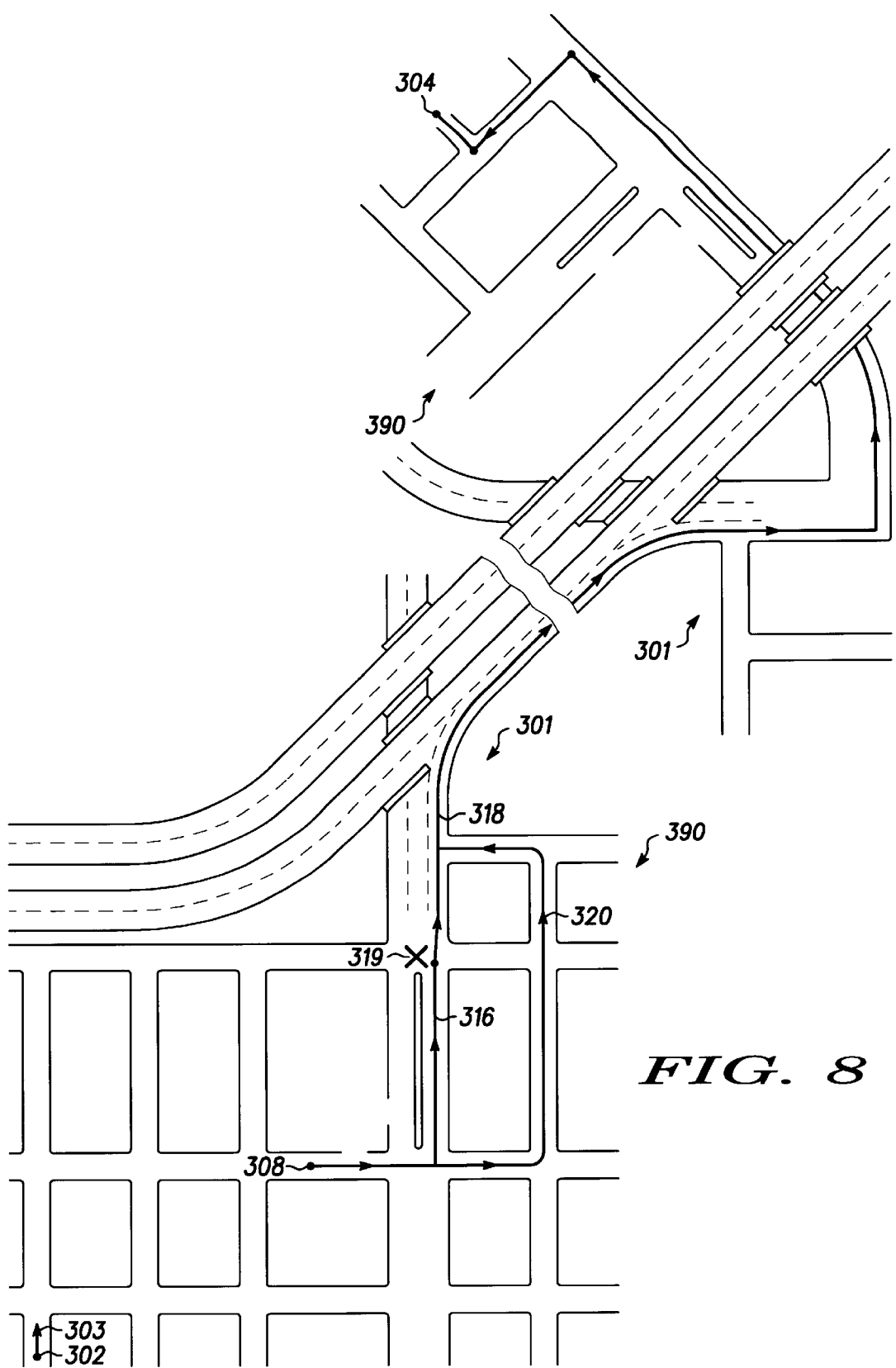
FIG. 8 depicts a simplified roadway network illustrating another exemplary embodiment of the invention continued from FIG. 7.

FIG. 8 depicts a simplified roadway network 390 illustrating another exemplary embodiment of the invention continued from FIG. 7. As shown in FIG. 8, the actual second location 308 of remote communications node is determined and/or selected upon receipt of a portion of navigation route 301. Upon receipt of a portion of navigation route 301, the actual second location 308 is determined utilizing positioning device(s) 124, route guidance applications 193 and the like. The actual second location 308 is compared with the set of multiple route threads based on locus of possible second locations 307 calculated and transmitted from servers 102 via communications node 104, 106, 108. Once actual second location 308 is determined, remote communications node 108 can proceed utilizing the route thread associated with actual second location 308 to communicate the necessary maneuvers to arrive at destination location 304.

In another embodiment of the invention, remote communications node 108 can either request or have automatically updated the set of multiple route threads based on the actual location 308 of remote communications node 108 and destination location 204. Updating can also occur as each of the plurality of route segments is completed. After determining actual second location 308, remote communications node can request an update to navigation route 301, which can incorporate content from other applications, such as traffic applications 194, and the like. For example, after determining actual second location 308, an update of navigation route 301 can incorporate traffic information such as that of an accident known to be blocking an intersection on the navigation route 301. The accident is shown as an "X" and labeled 319 in FIG. 8. In the present embodiment of the invention, the update to navigation route 301 can include an additional set of multiple route threads that include one or more route segments 320 calculated to avoid the blocked intersection.

In another embodiment, route server 184 can anticipate one or more alternative route threads 320 along navigation route 301 other than in the vicinity of first location 302 and destination location 304. The alternative route threads can be based on historical traffic data, user-driving patterns, and the like, in order to anticipate likely or often used deviations from navigation route 301. In this manner, if the remote communications node 108 deviates from a navigation route 301 or route thread along the navigation route 301, alternative route threads 320 are already communicated to remote communications node 108. So when the deviation occurs, a new route segment and route thread is selected based on a current location of remote communications node 108, and corresponding maneuvers are communicated to the user of remote communications node 108.

Figure 9:
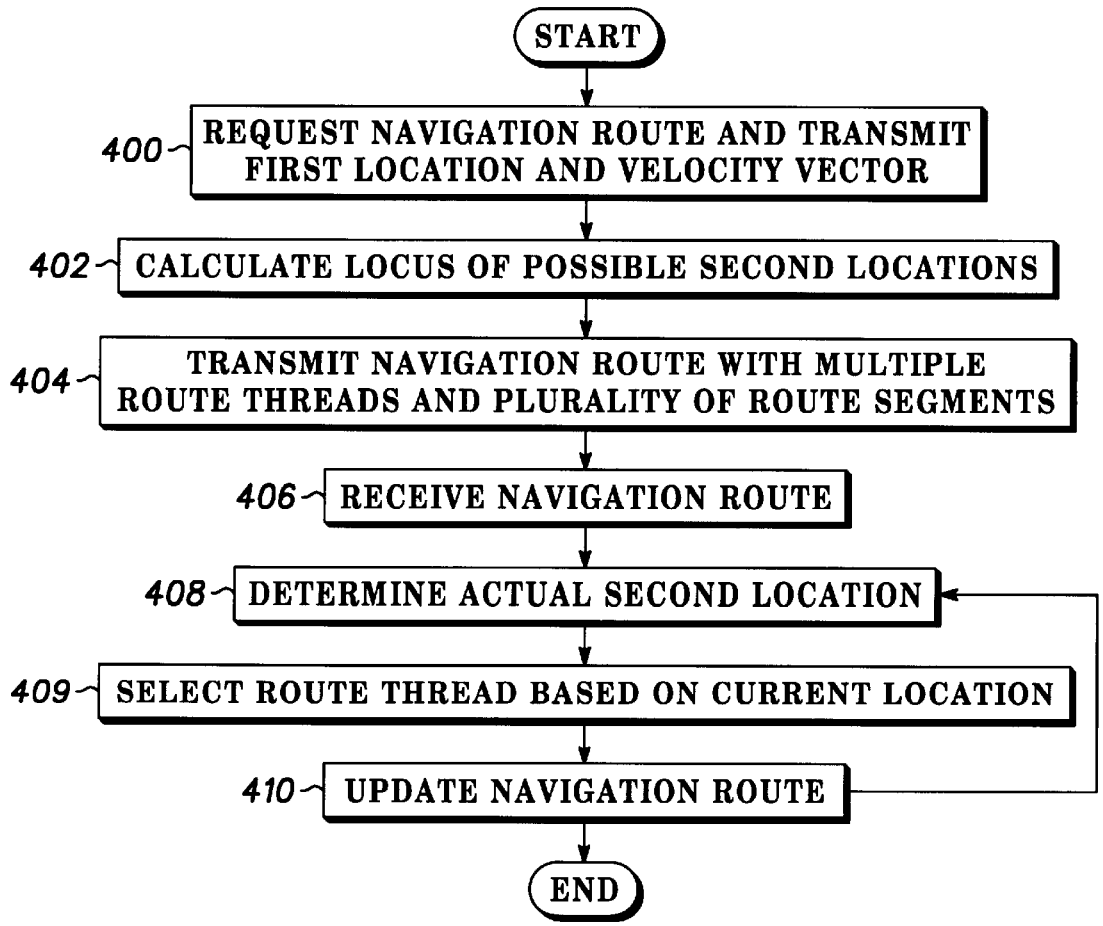
FIG. 9 shows a flow chart of a method of navigation guidance according to one embodiment of the invention.

FIG. 9 shows a flow chart of a method of navigation guidance according to one embodiment of the invention. In step 400, remote communications node 108 requests navigation route 201, 301 from it's present location to a destination location, and transmits the location 202, 302 of remote communications node 108 (either a stationary location, i.e. location 202, or first location, i.e. 302) and velocity vector 303 to servers 102 and communications node 104, 106.

In step 402, the locus of possible second locations is calculated. This can also include the set of multiple route threads if remote communications node 108 is stationary. In step 404, navigation route 201, 301 is transmitted to remote communications node 108 with multiple route threads and route segments.

In step 406, remote communications node 108 receives navigation route 201, 301. In step 408, the actual second location 308 of remote communications node 108 is determined and the corresponding set of multiple route threads are utilized and maneuvers communicated to any interested actors, which can include a user of remote communications node 108. Maneuvers are communicated to interested actors via wireless or wireline communication means, voice and visual communication means, and the like.

In step 409 a route thread is selected from the set of multiple route threads based on a current location of remote communications node 108. In the case of multiple route threads using the same route segment, the route thread representing the preferred route is selected. A set of maneuver instructions are communicated to a user of the remote communications node 108 based on the route thread selected.

In optional step 410, navigation route 201, 301, including set of multiple route threads and route segments are updated either automatically or on request to take into account the present location of remote communications node 108 and optionally, any other road conditions, such as accidents, road closures, weather conditions, and the like. This process can repeat as often as necessary each time a new actual second location 308 is determined or updated.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A method of navigation guidance comprising:
   providing a communications node;
   providing a remote communications node;
   requesting a navigation route be communicated from the communications node to the remote communications node, wherein the navigation route is from a location of the remote communications node to a destination location;
   transmitting the navigation route to the remote communications node, wherein the navigation route comprises a plurality of route segments, wherein the plurality of route segments are based on the location of the remote communications node, and wherein the plurality of route segments comprise a set of multiple route threads from the location of the remote communications node to the destination location; and
   receiving the navigation route at the remote communications node, wherein the remote communications node is in a first location at a first time and in a locus of possible second locations at a second time, and wherein requesting the navigation route occurs at the first time and receiving he navigation route occurs at the second time.

2. The method of claim 1, wherein transmitting the navigation route comprises transmitting the navigation route based on the locus of possible second locations of remote communications node.

3. The method of claim 1, further comprising calculating the locus of possible second locations based on the first location and a velocity vector of the remote communications node.

4. The method of claim 1, wherein transmitting the navigation route comprises transmitting the navigation route sequentially with the plurality of route segments nearest the locus of possible second locations transmitted first.

5. The method of claim 1, further comprising determining an actual second location of the remote communications node upon receipt of a portion of the navigation route by the remote communications node.

6. The method of claim 5, further comprising updating the navigation route and the set of multiple route threads based on the actual second location of the remote communications node, wherein the set of multiple route threads are from the actual location of the remote communications node to the destination location.

7. The method of claim 6, wherein the set of multiple route threads comprise one or more alternate route threads.

8. The method of claim 5, further comprising requesting an update to the navigation route from the actual second location to the destination location.

9. A method of navigation guidance comprising:
providing a communications node;
providing a remote communications node;
requesting a navigation route be communicated from the communications node to the remote communications node, wherein the navigation route is from a location of the remote communications node to a destination location;
transmitting the navigation route to the remote communications node, wherein the navigation route comprises a plurality of route segments, wherein the plurality of route segments are based on the location of the remote communications node, and wherein the plurality of route segments comprise a set of multiple route threads from the location of the remote communications node to the destination location; and
updating the navigation route and the set of multiple route threads from the location of the remote communications node to the destination location as each of the plurality of route segments is traversed by the remote communications node.

10. A method of navigation guidance comprising:
providing a communications node;
providing a remote communications node;
requesting a navigation route be communicated from the communications node to the remote communications node, wherein the navigation route is from a location of the remote communications node to a destination location, and wherein requesting the navigation route comprises transmitting the location and a velocity vector of the remote communications node to the communications node; and
transmitting the navigation route to the remote communications node, wherein the navigation route comprises a plurality of route segments, wherein the plurality of route segments are based on the location of the remote communications node, and wherein the plurality of route segments comprise a set of multiple route threads from the location of the remote communications node to the destination location.

11. A method of navigation guidance comprising:
providing a communications node;
providing a remote communications node;
requesting a navigation route be communicated from the communications node to the remote communications node, wherein the navigation route is from a location of the remote communications node to a destination location; and
transmitting the navigation route to the remote communications node, wherein the navigation route comprises a plurality of route segments, wherein the plurality of route segments are based on the location of the remote communications node, wherein the plurality of route segments comprise a set of multiple route threads from the location of the remote communications node to the destination location, and wherein transmitting the navigation route comprises transmitting a plurality of starting locations, wherein the plurality of starting locations are based on an accuracy of the location of the remote communications node.

12. A method of navigation guidance comprising:
providing a communications node;
providing a remote communications node;
requesting a navigation route be communicated from the communications node to the remote communications node, wherein the navigation route is from a location of the remote communications node to a destination location;
transmitting the navigation route to the remote communications node, wherein the navigation route comprises a plurality of route segments, wherein the navigation route comprises a plurality of starting locations based on the location of the remote communications node, and wherein each of the plurality of starting locations corresponds to at least one starting route segment; and
selecting the at least one starting route segment based on the location and a velocity vector of the remote communications node.

13. A method of navigation guidance comprising:
providing a communications node;
providing a remote communications node;
requesting a navigation route be communicated from the communications node to the remote communications node, wherein the navigation route is from a location of the remote communications node to a destination location; and
transmitting the navigation route to the remote communications node, wherein the navigation route comprises a plurality of route segments, wherein the navigation route comprises a plurality of starting locations based on the location of the remote communications node, wherein each of the plurality of starting locations corresponds to at least one starting route segment, and wherein the plurality of starting locations are based on an accuracy of the location of the remote communications node.

14. A method of navigation guidance comprising:
providing a communications node;
providing a remote communications node;
requesting a navigation route be communicated from the communications node to the remote communications node, wherein the navigation route is from a location of the remote communications node to a destination location;
transmitting the navigation route to the remote communications node, wherein the navigation route comprises a plurality of route segments, wherein the navigation route comprises a plurality of starting locations based on the location of the remote communications node, and wherein each of the plurality of starting locations corresponds to at least one starting route segment; and
receiving the navigation route at the remote communications node, wherein the remote communications node is in a first location at a first time and in a locus of possible second locations at a second time, and wherein requesting the navigation route occurs at the first time and receiving the navigation route occurs at the second time.

15. The method of claim 14, wherein transmitting the navigation route comprises transmitting the navigation route based on the locus of possible second locations of remote communications node.

16. The method of claim 14, further comprising calculating the locus of possible second locations based on the first location and a velocity vector of the remote communications node.

17. The method of claim 14, wherein transmitting the navigation route comprises transmitting the navigation route sequentially with the plurality of route segments nearest the locus of possible second locations transmitted first.

18. The method of claim 14, further comprising determining an actual second location of the remote communications node upon receipt of a portion of the navigation route by the remote communications node.

19. The method of claim 18, further comprising requesting an update to the navigation route from the actual second location to the destination location.

20. A computer-readable medium containing computer instructions for instructing a processor to perform a method of operating a communications node comprising a remote communications node, the instructions comprising:
   requesting a navigation route be communicated from the communications node to the remote communications node, wherein the navigation route is from a location of the remote communications node to a destination location;
   transmitting the navigation route to the remote communications node, wherein the navigation route comprises a plurality of route segments, wherein the plurality of route segments are based on the location of the remote communications node, and wherein the plurality of route segments comprise a set of multiple route threads from the location of the remote communications node to the destination location; and
   receiving the navigation route at the remote communications node, wherein the remote communications node is in a first location at a first time and in a locus of possible second locations at a second time, and wherein requesting the navigation route occurs at the first time and receiving the navigation route occurs at the second time.

21. The computer-readable medium in claim 20, wherein transmitting the navigation route comprises transmitting the navigation route based on the locus of possible second locations of remote communications node.

22. The computer-readable medium in claim 20, the instructions further comprising calculating the locus of possible second locations based on the first location and a velocity vector of the remote communications node.

23. The computer-readable medium in claim 20, wherein transmitting the navigation route comprises transmitting the navigation route sequentially with the plurality of route segments nearest the locus of possible second locations transmitted first.

24. The computer-readable medium in claim 20, the instructions further comprising determining an actual second location of the remote communications node upon receipt of a portion of the navigation route by the remote communications node.

25. The computer-readable medium in claim 24, the instructions comprising updating the navigation route and the set of multiple route threads based on the actual second location of the remote communications node, wherein the set of multiple route threads are from the actual location of the remote communications node to the destination location.

26. The computer-readable medium in claim 25, wherein the set of multiple route threads comprise one or more alternate route threads.

27. The computer-readable medium in claim 24, the instructions further comprising requesting an update to the navigation route from the actual second location to the destination location.

28. A computer-readable medium containing computer instructions for instructing a processor to perform a method of operating a communications node comprising a remote communications node, the instructions comprising:
   requesting a navigation route be communicated from the communications node to the remote communications node, wherein the navigation route is from a location of the remote communications node to a destination location;
   transmitting the navigation route to the remote communications node, wherein the navigation route comprises a plurality of route segments, wherein the plurality of route segments are based on the location of the remote communications node, and wherein the plurality of route segments comprise a set of multiple route threads from the location of the remote communications node to the destination location; and
   updating the navigation route and the set of multiple route threads from the location of the remote communications node to the destination location as each of the plurality of route segments is traversed by the remote communications node.

29. A computer-readable medium containing computer instructions for instructing a processor to perform a method of operating a communications node comprising a remote communications node, the instructions comprising:
   requesting a navigation route be communicated from the communications node to the remote communications node, wherein the navigation route is from a location of the remote communications node to a destination location;
   transmitting the navigation route to the remote communications node, wherein the navigation route comprises a plurality of route segments, wherein the navigation route comprises a plurality of starting locations based on the location of the remote communications node, and wherein each of the plurality of staring locations corresponds to at least one starting route segment; and
   selecting the at least one starting route segment based on the location and a velocity vector of the remote communications node.

30. A computer-readable medium containing computer instructions for instructing a processor to perform a method of operating a communications node comprising a remote communications node, the instructions comprising:
   requesting a navigation route be communicated from the communications node to the remote communications node, wherein the navigation route is from a location of the remote communications node to a destination location; and
   transmitting the navigation route to the remote communications node, wherein the navigation route comprises a plurality of route segments, wherein the navigation route comprises a plurality of starting locations based on the location of the remote communications node, wherein each of the plurality of staring locations corresponds to at least one starting route segment, and wherein the plurality of starting locations are based on an accuracy of the location of the remote communications node.

* * * * *